United States Patent [19]
Pickett

[11] 3,982,562

[45] Sept. 28, 1976

[54] PRESSURE CONTROL APPARATUS

[75] Inventor: David A. Pickett, Warren, Mich.

[73] Assignee: Allied Chemical Corporation, Morris Township, N.J.

[22] Filed: Oct. 4, 1974

[21] Appl. No.: 512,801

[52] U.S. Cl. .................... 137/625.4; 137/625.44; 137/605; 137/612; 251/138; 251/139
[51] Int. Cl.² .................................... F16K 31/10
[58] Field of Search............ 137/625.4, 625.44, 612, 137/605; 251/138, 139

[56] References Cited
UNITED STATES PATENTS

| | | | |
|---|---|---|---|
| 2,850,258 | 9/1958 | Lazich | 251/138 X |
| 2,912,012 | 11/1959 | Klingler | 137/625.44 |
| 2,993,149 | 7/1961 | Persons | 251/138 X |
| 3,036,808 | 5/1962 | Fox | 251/138 X |
| 3,532,121 | 10/1970 | Sturman | 137/625.4 |
| 3,586,287 | 6/1971 | Knobel | 251/139 X |
| 3,692,057 | 9/1972 | Barnd | 137/625.44 |

Primary Examiner—Arnold Rosenthal
Attorney, Agent, or Firm—John P. Kirby, Jr.

[57] ABSTRACT

An electrically-operated pressure control apparatus is adapted to perform switching and actuating functions and is capable of operating in response to high pressure or in response to an absence of pressure, that is, a vacuum. The apparatus includes: a first pressure conduit, a second pressure conduit, a third pressure conduit, a coil assembly and an armature assembly. The armature assembly is adapted to be operated electromagnetically when the coil assembly is energized. The armature assembly includes a sealing lever, an armature lever, a return spring, and a pivot means. The sealing lever has sealing means, preferably at one end thereof, adapted to open and close a first passageway in the first pressure conduit, and adapted to close and open a second passageway in the second pressure conduit. The effective, operating length of the armature lever is greater than the effective, operating length of the sealing lever. As a result, the armature assembly has a mechanical advantage resulting from the ratio of the length of the armature lever to the length of the sealing lever.

22 Claims, 6 Drawing Figures

PRESSURE CONTROL APPARATUS

BACKGROUND OF THE INVENTION

This invention relates to an electrically-operated pressure control apparatus adapted to perform switching and actuating functions. The pressure control apparatus is capable of operating in response to high pressure or in response to an absence of pressure, that is, a vacuum.

Prior art pressure control apparatus having different structural design and operation are described in U.S. Pat. Nos. 2,850,258 to Lazich; 2,789,784 to Cobb; 2,993,149 to Persons; 3,570,807 to Sturman; and 3,532,121 to Sturman.

SUMMARY OF THE INVENTION

The generic invention of the electrically-operated pressure control apparatus is adapted to perform switching and actuating functions, in a fluid media, either gaseous or liquid. The generic invention and four embodiments of the apparatus, which are described in the Detailed Description, include: a first pressure conduit, a second pressure conduit, a third pressure conduit, a coil assembly and an armature assembly. The first pressure conduit has a first passageway extending through the first pressure conduit. The second pressure conduit has a second passageway extending through the second pressure conduit. The third pressure conduit has a third passageway extending through the third pressure conduit. The coil assembly is adapted to be energized electrically and is disposed within the apparatus. The armature assembly is adapted to be operated electromagnetically when the coil assembly is energized.

The armature assembly includes a sealing lever, an armature lever, a return spring, and a pivot means. The sealing lever has sealing means adapted to open and close the first passageway. The armature lever is adapted to be acted upon directly by the coil assembly and is adapted to pivot between an actuated position and a non-actuated position as a result of the magnetic force from the coil assembly. The return spring biases the armature lever in the non-actuated position. The pivot means in this embodiment is a pivot point upon which the armature assembly pivots between the actuated position and the non-actuated position.

The armature lever is an elongated member having a pivot end and a coil end. The sealing lever is an elongated member having a pivot end and a seal end. The pivot end of the sealing lever is joined to the pivot end of the armature lever. The armature lever has an effective, operating length which is the length measured from the pivot end along that portion of the armature lever which is exposed to and operated upon by the coil assembly. The effective, operating length of the armature lever is preferably equal to substantially the entire length of the armature lever from the pivot end to the coil end. Similarly, the sealing lever has an effective, operating length which is the length measured from the pivot end to the sealing means. The sealing means is preferably at the opposite end of the sealing lever from the pivot end. The effective, operating length of the sealing lever is preferably equal to substantially the entire length of the sealing lever from the pivot end to the sealing end. The effective, operating length of the armature lever is greater than the effective, operating length of the sealing lever. As a result, the armature assembly has a mechanical advantage resulting from the ratio of the length of the armature lever to the length of the sealing layer. Preferably, the mechanical advantage, i.e. the ratio, is approximately 1½:1 or 2:1 or 3:1.

The armature assembly is adapted to apply the mechanical advantage with reference to the force exerted by the coil assembly upon the armature lever and with reference to a force exerted by a portion of the sealing lever adjacent to the seal end of the sealing lever. As a consequence, the force from the coil assembly upon the armature lever is multiplied by the mechanical advantage for purposes of the force applied at the portion of the sealing lever adjacent to the seal end of the sealing lever.

In a first and preferred embodiment, the first passageway has an interior and an exterior end. The second passageway has an interior end and an exterior end. The interior end of the first passageway is disposed adjacent to the interior end of the second passageway. The sealing means is disposed between the interior end of the first passageway and the interior end of the second passageway. The sealing means is adapted to move between a sealing position at the interior end of the first passageway and a sealing position at the interior end of the second passageway. Preferably, the sealing means includes: a first seal disposed on a first passageway side of the sealing lever at the seal end of the sealing lever; and a second seal disposed on a second passageway side of the sealing lever at the seal end of the sealing lever. The third pressure conduit extends through the approximate center of the coil assembly. The third passageway is adapted to communicate alternately with the first passageway and the third passageway, depending upon the position of the armature assembly.

The coil assembly includes a solenoid and a means for receiving an electrical signal. The means for receiving an electrical signal is adapted to conduct the electrical signal to the solenoid to energize the solenoid. The solenoid has a hollow interior adapted to receive the second pressure conduit.

DETAILED DESCRIPTION

Figure 1:
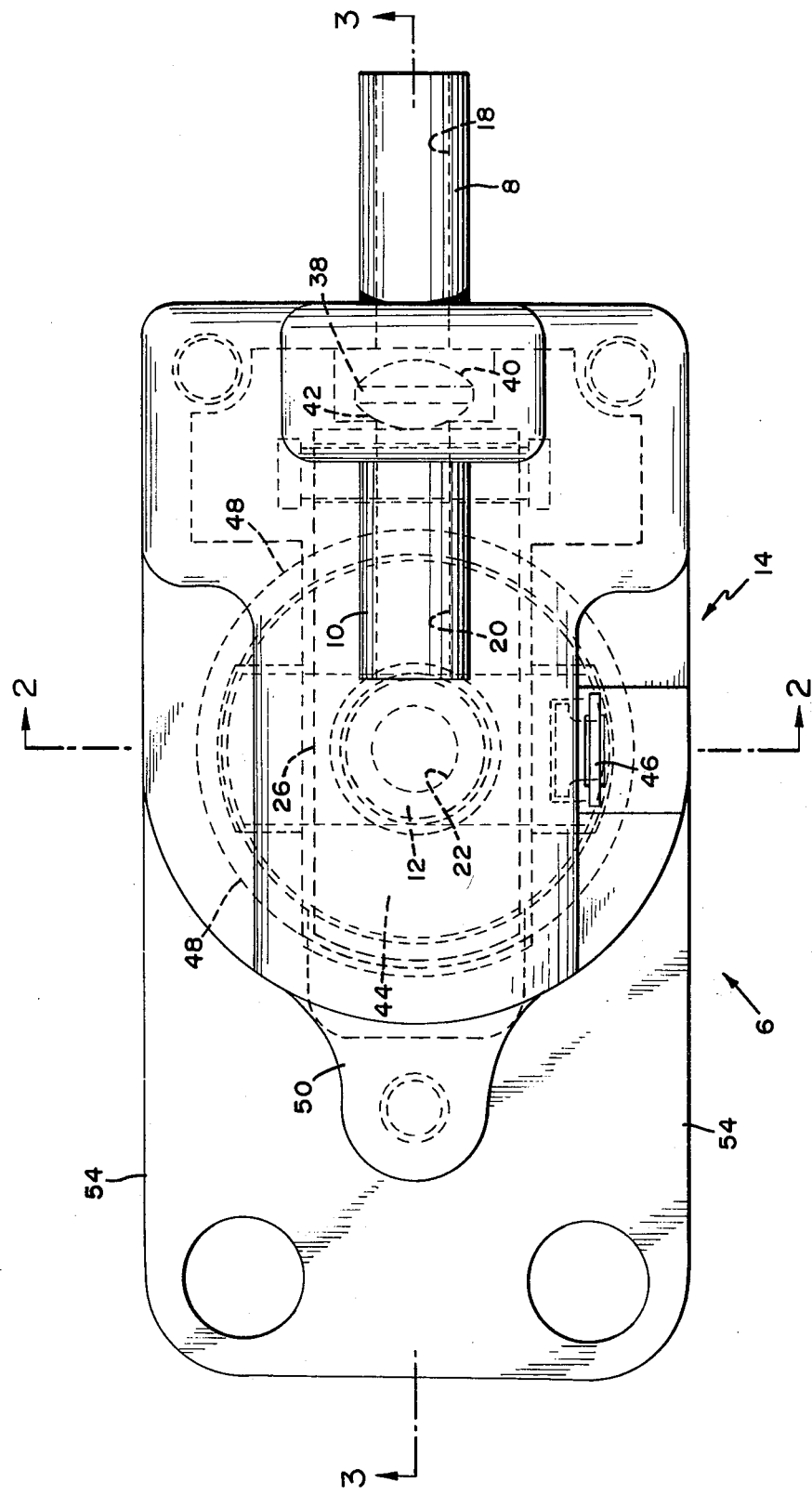
FIG. 1 is an enlarged top view of a first embodiment of the pressure control apparatus.
Figure 2:
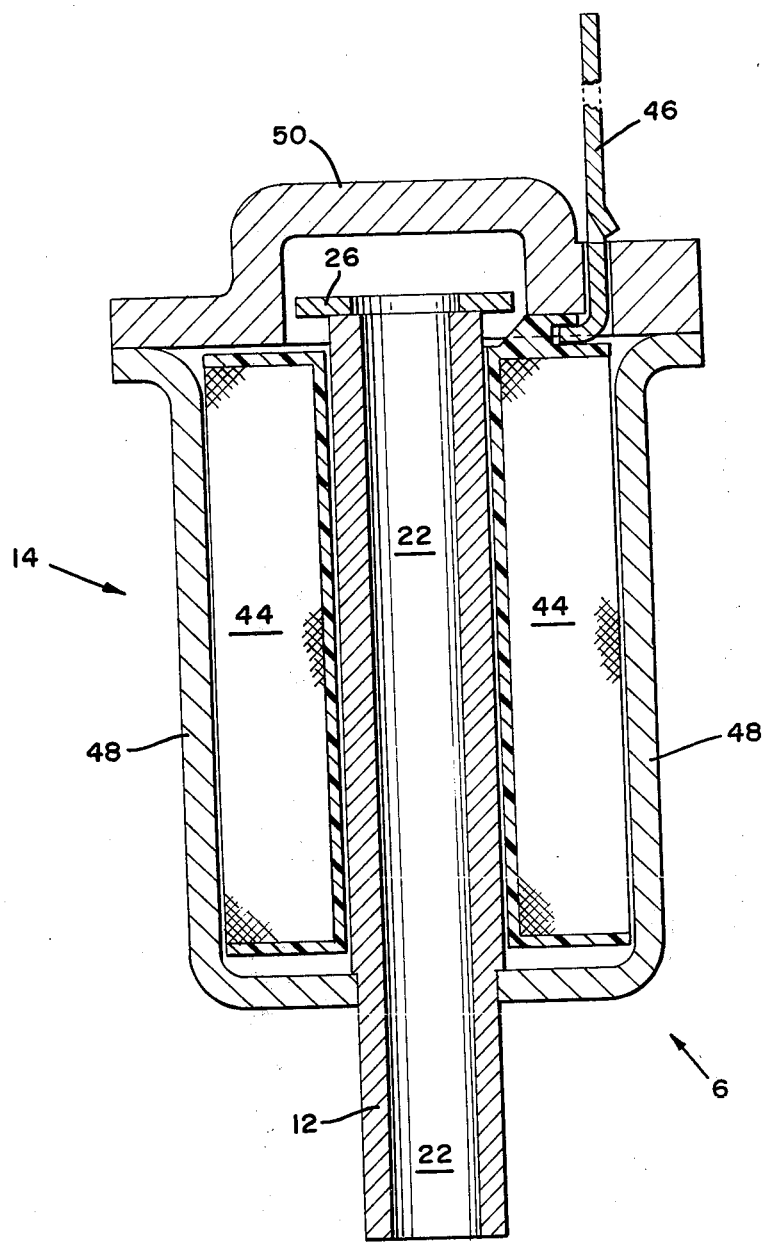
FIG. 2 is a partial cross-section view of FIG. 1 along the lines 2—2.
Figure 3:
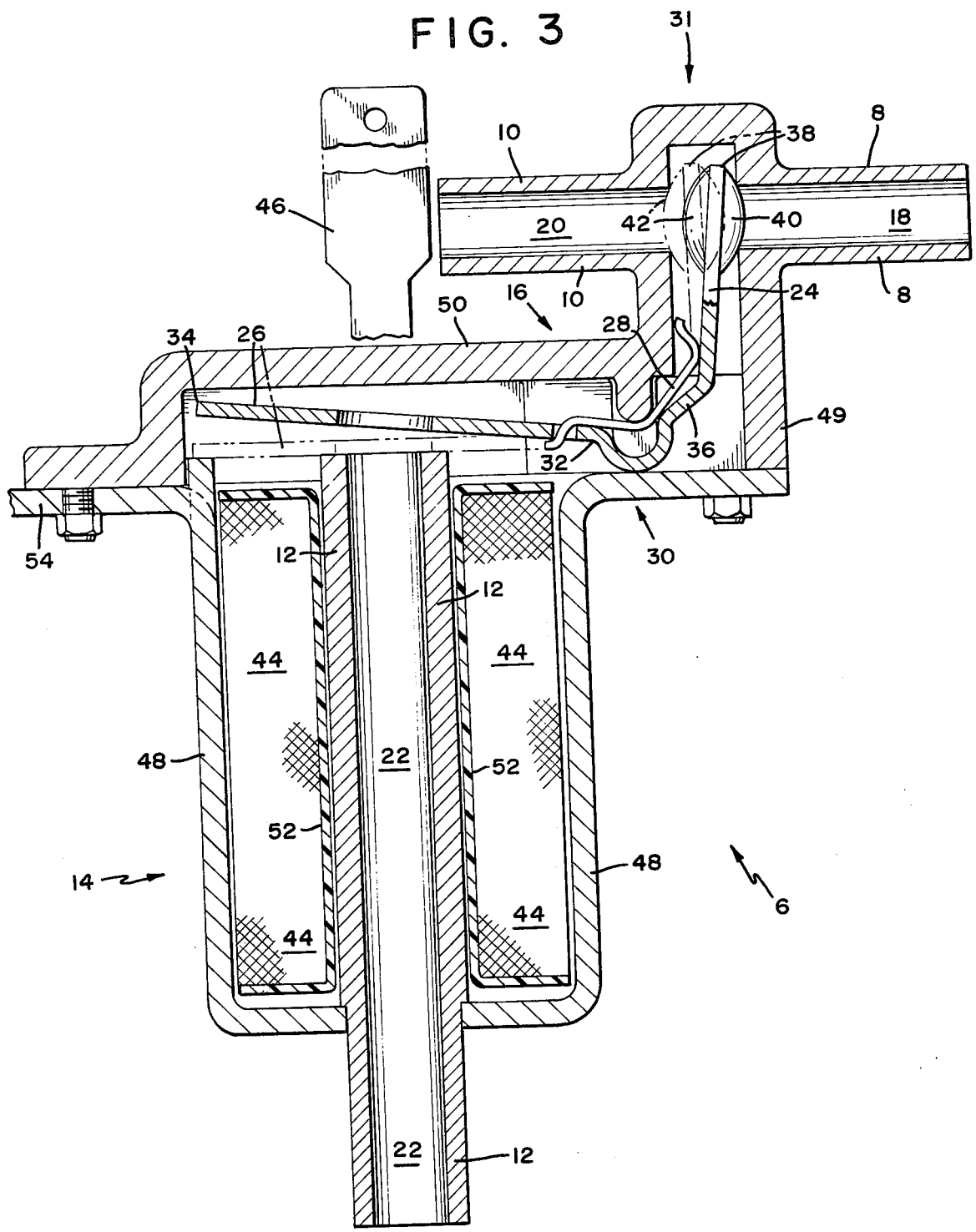
FIG. 3 is a cross-sectional view of FIG. 1 along the lines 3—3.

Referring to FIGS. 1, 2 and 3, a first and preferred embodiment of the electrically-operated, pressure control apparatus of this invention is indicated generally by the numeral 6 and is adapted for use with either gas or liquid. Referring to FIG. 3, the first embodiment 6 includes a first pressure conduit 8, a second pressure conduit 10, a third pressure conduit 12, a coil assembly 14 and an armature assembly 16. The first pressure conduit 8 has an exterior end, an interior end and a first passageway 18 extending through the first pressure conduit 8. The second pressure conduit 10 has an exterior end, an interior end, and a second passageway 20 extending through the second pressure conduit 10. The third pressure conduit 12 has an exterior end, an interior end, and a third passageway 22 extending through the third pressure conduit 12. A longitudinal axis of the first pressure conduit 8 is approximately aligned with a longitudinal axis of the second pressure conduit 10 and approximately perpendicular to an extended longitudinal axis of the third pressure conduit 12. The coil assembly 14 is adapted to be energized electrically and exert magnet force. The coil assembly 14 is disposed within the apparatus 6. Armature assembly 16 has an actuated position, and a non-actuated position, and is adapted to be operated electromagnetically when the coil assembly 14 is energized.

Referring to FIG. 3, the armature assembly 16 includes a sealing lever 24, an armature lever 26, a return spring 28, and a pivot means 30. The sealing lever 24 has sealing means 31 adapted to close and open the first passageway 18 and the second passageway 20. The armature lever 26 is adapted to be acted upon directly by the coil assembly 14 and is adapted to pivot between its actuated position and a non-actuated position as a result of the magnetic force from the coil assembly 14. The return spring 28 preferably is a type of leaf spring which resiliently biases the armature lever 26 in the non-actuated position. The pivot means 30 is a pin-type pivot point upon which the armature assembly 16 pivots between the actuated position and the non-actuated position.

The armature lever 26 is an elongated member having a pivot end 32 and a coil end 34. The pivot end 32 is preferably disposed at the opposite end of the armature lever 26 from the coil end 34. The sealing lever 24 is an elongated member having a pivot end 36 and a seal end 38. The pivot end 36 of the sealing lever 24 is joined to and preferably integral with the pivot end 32 of the armature lever 26. The longitudinal axis of the sealing lever 24 is preferably arranged approximately perpendicular to the longitudinal axis of the armature lever 26. The armature lever 26 has an effective, operating length which is the length measured from the pivot end 32 along that portion of the armature lever 26 which is exposed to and operated upon by the coil assembly 14. The effective, operating length of the armature lever 26 is preferably equal to substantially the entire length of the armature lever 26 from the pivot end 32 to the coil end 34. Similarly, the sealing lever 24 has an effective, operating length which is the length measured from the pivot end 36 to the sealing means 31. The sealing means 31 is preferably at the opposite end of the sealing lever 24 from the pivot end 36. The effective, operating length of the sealing lever 24 is preferably equal to substantially the entire length of the sealing lever 24 from the pivot end 36 to the seal end 38. The effective, operating length of the armature lever 26 is greater than the effective, operating length of the sealing lever 24. As a result, the armature assembly 16 has a mechanical advantage resulting from the ratio of the effective, operating length of the armature lever 26 to the effective, operating length of the sealing lever 24. Preferably, the mechanical advantage, i.e. the ratio, is approximately 1½:1 or 2:1 or 3:1.

The armature assembly 16 is adapted to apply the mechanical advantage with reference to the force exerted by the coil assembly 14 upon at least a portion, and preferably the effective operating length, of the armature lever 26 and with reference to a force exerted by a portion of the sealing lever 24 adjacent to the seal end 38 of the sealing lever 24. As a consequence, the force from the coil assembly 14 upon the armature lever 26 is multiplied by the mechanical advantage for purposes of the force applied at the portion of the sealing lever adjacent to the seal end 38 of the sealing lever 24.

The first passageway 18 is aligned with the second passageway 20 and is disposed perpendicular to the plane of the third pressure conduit 12. The first passageway 18 has an interior end and exterior end. The second passageway 20 has an interior end and an exterior end. The interior end of the first passageway 18 is disposed adjacent to the interior end of the second passageway 20. The sealing means 31 is disposed between the interior end of the first passageway 18 and the interior end of the second passageway 20. The sealing means 31 is adapted to move between a sealing position at the interior end of the first passageway 18 and a sealing position at the interior end of the second passageway 20.

Preferably, the sealing means 31 includes: a first seal 40 shown in solid lines disposed on a first passageway side of the sealing lever 24 at the seal end 38 of the sealing lever 24; and a second seal 42 shown in dashed lines disposed on a second passageway side of the sealing lever 24 at the seal end 38 of the sealing lever 24. The first seal 40 and the second seal 42 are made of a resilient material, such as neoprene or rubber. The third pressure conduit 12 extends through the approximate center of the coil assembly 14. The third passageway 22 is adapted to communicate alternately with the first passageway 18 and second passageway 20, depending upon the position of the armature assembly 16.

The coil assembly 14 is adapted for operation on direct current (DC) and/or alternating current (AC) and includes a solenoid 44 and a means 46, such as an electrical terminal, for receiving an electrical signal. The solenoid 44 has a length of conducting wire wound in a coil. The means 46 for receiving an electrical signal is adapted to conduct the electrical signal to the solenoid 44 to energize the solenoid 44. The solenoid 44 has a hollow interior adapted to receive the third pressure conduit 12.

Referring to FIG. 3, the armature assembly 16, including the sealing lever 24 and the armature lever 26, has an actuated position shown partially in dashed lines and a non-actuated position shown in solid lines. In the non-actuated position, the sealing means 31, such as the first seal 40, is disposed against the interior end of the first passageway 18, closing the first passageway 18. In the non-actuated position, the armature lever 26 is disposed away from the coil assembly 14. In the non-actuated position, the sealing lever 24 is disposed closer to the first passageway 18 than to the second passageway 20.

The first embodiment 6 further includes a housing 48 disposed around the coil assembly 14 which, in turn, is disposed around the third pressure conduit 12. The first embodiment 6 also includes a cover 50 over the armature assembly 16. Preferably, the first pressure conduit 8 and the second pressure conduit 10 are integral with the cover 50. The coil assembly 14 further includes a bobbin 52 on which conducting wire is wound to form the solenoid 44. The first embodiment 6 also includes a bracket 54 mounted on the housing 48. The function of the bracket 54 is to provide a convenient means for mounting the electrically operated pressure control apparatus.

In operation, when a signal is received by the signal transmitting means 46, such as an electrical terminal connected to the solenoid 44, the signal is transmitted to the solenoid 44 and energizes the solenoid 44. Thus, the solenoid 44 becomes an electromagnet and attracts the armature lever 26 adjacent to the coil end 34 of the armature lever 26. The portion of the armature lever 26 attracted by the solenoid 44, i.e. the effective, operating length of the armature lever 26, is preferably equal to substantially the entire length of the armature lever 26 from the pivot end 32 to the coil end 34. Such magnetic attraction moves the armature lever 26 in the downward direction, as shown in FIG. 3. in the actuated position, the armature lever 26 is held adjacent to the solenoid 44 and completes the operating magnetic loop of the housing 48.

The movement of the armature lever 26 from the non-actuated position downward to the actuated position causes the sealing lever 24 to move in the direction from right to left as shown in FIG. 3, that is, in the direction toward the second passageway 20. Such movement of the sealing lever 24 moves the second seal 42 against the interior end of the second passageway 20, closing the second passageway 20 and opening in the first passageway 18. When the armature assembly 16 is in its non-actuated position, the third passageway 22 is in communication with the second passageway 20 through the enclosure formed by cover 50 with housing 48. When the armature assembly 16 is in its actuated position, the third passageway 22 is in communication with the first passageway 18 through the enclosure formed by cover 50 with housing 48.

As an example of one of the many ways in which the first embodiment 6 pressure control apparatus of this invention may be used, the first passageway 18 may be connected, as an inlet passageway, to the intake manifold of an automobile and the third passageway 22 connected, as an outlet passageway, to a linear motor to advance the spark in a distributor of the automobile. The second passageway 20 is a return passageway exposed to outside air at atmospheric pressure. When an electrical signal is applied to the solenoid 44, a vacuum which is present in the first passageway 18 is communicated to the third passageway 22 to operate the linear motor, and substantially simultaneously the atmospheric pressure of the second passageway 20 is closed by second seal 42. When thee electrical signal is removed from the solenoid 44, the third passageway 22 is placed in communication with the second passageway 20 having atmospheric pressure and the first passageway 18 is closed by first seal 40, thereby removing the vacuum.

As another example of the way in which the first embodiment 6 of the pressure control apparatus of this invention may be used, the third passageway 22 may be used as the inlet passageway. Both the first passageway 18 and the second passageway 20 may be used as outlet passageways. When the electric signal is applied to the solenoid 44, a vacuum or pressure at the third passageway 22 is communicated to the first passageway 18 and the second passageway 20 is closed by second seal 42. When the electrical signal is removed from the solenoid 44, the third passageway 22 is placed in communication with the second passageway 20 and the first passageway 18 is closed by first seal 40. Thus, in the first embodiment 6, an inlet pressure or vacuum at the third passageway 22 can be selectively communicated at either one of two alternate passageways, either the first passageway 18 or the second passageway 20.

Figure 4:
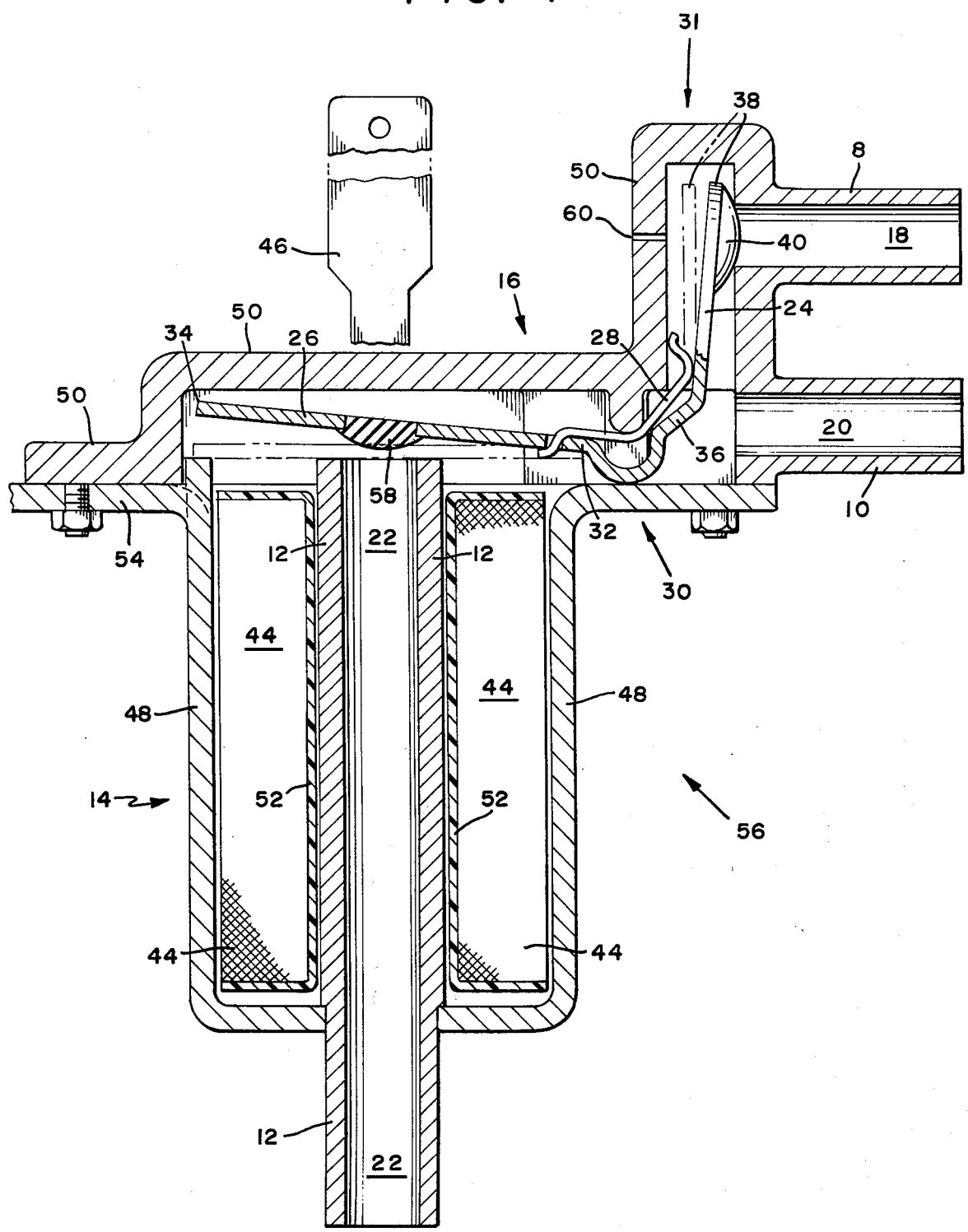
FIG. 4 is a cross-sectional view of a second embodiment of the pressure control apparatus.

Referring to FIG. 4, a second embodiment of the electrically operated pressure control apparatus of this invention is indicated generally by the numeral 56, and is adapted for use with either gas or liquid. The second embodiment 56 is similar to the first embodiment 6, except that the second pressure conduit 10 having a second passageway 20 is arranged on the same side of the sealing lever 24 as the first pressure conduit 8. The first pressure conduit 8 is disposed approximately parallel to the second pressure conduit and approximately perpendicular to the extended longitudinal axis of the third pressure conduit 12. Also, a third seal 58 is arranged on the lower side of the armature lever 26 adjacent to the third passageway 22 of the third pressure conduit 12. The third passageway 22 has an interior end and an exterior end. The third seal 58 is adapted to open and close the interior end of the third pressure conduit 12 when the armature assembly 16 is moved between its non-actuated position and its actuated position. The second embodiment 56, like the first embodiment 6, may be considered as normally closed because the first seal 40 covers the first passageway 18 when the armature assembly 16 is in the non-actuated position.

As an example of the way in which the second embodiment 56 may be used, the first passageway 18 may be connected, as an inlet passageway, to a source of vacuum or a source of high pressure. The second passageway 20 is used as the outlet passageway. The third passageway 22 is used as the return passageway and is merely exposed to outside air at atmospheric pressure. When an electrical signal is applied to energize the solenoid 44, a vacuum or high pressure which is present in the first passageway 18 is communicated to the second passageway 20 and the third passageway 22 is closed by means of the third seal 58. When the electrical signal is removed to de-energize the solenoid 44, the first passageway 18 is closed, the third passageway 22 is opened, and the second passageway 20 is thereby placed in communication with the atmospheric pressure in the third passageway 22.

Referring to FIG. 4, the second embodiment need not have a second seal 42 on the sealing lever 24 at the seal end of the sealing lever 24 because the second passageway 20 is not located adjacent to the seal end of the sealing lever 24. Optionally for uses in response to gaseous vacuum, a bleed port 60 may be located in the portion of the cover 50 adjacent to the seal end 38 of the sealing lever 24 and on the opposite side of the sealing lever 24 from the first passageway 18. The bleed port 60 allows entry of air from the outside atmosphere into the pressure control apparatus 56 at all times, to purge the system being controlled.

Figure 5:
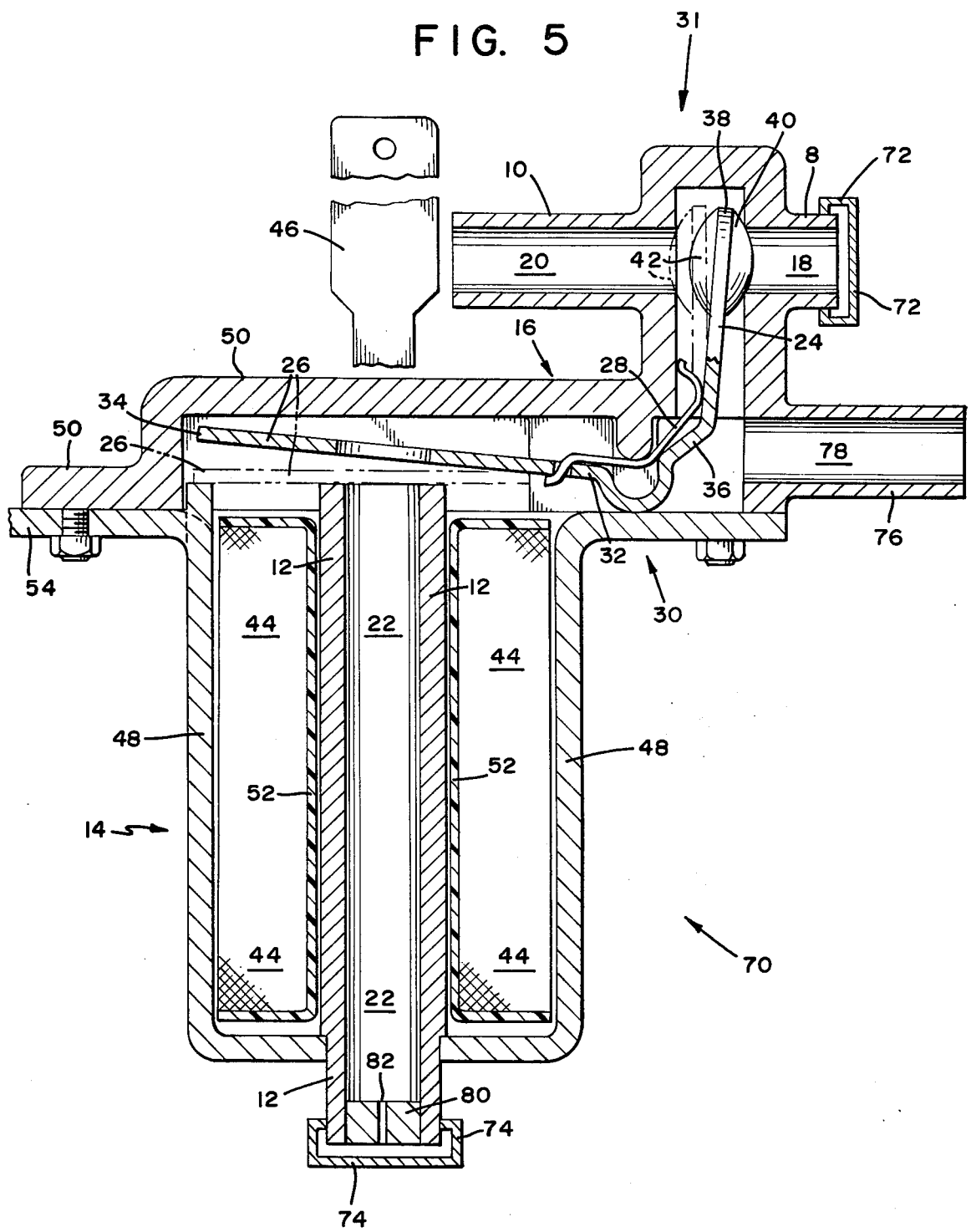
FIG. 5 is a cross-sectional view of a third embodiment of the pressure control apparatus.

Referring to FIG. 5, a third embodiment of the pressure control apparatus of this invention is indicated generally by the numeral 70 and is adapted for gaseous media only. The third embodiment 70 is similar to the first embodiment 6, except that it uses a first cap 72 over the exterior end of the first pressure conduit 8 and a second cap 74 over the exterior end of the third pressure conduit 12. The caps 72 and 74 preferably are splash-proof closures which prevent water, dirt and other foreign matter from entering the passageways 18 and 22. The first and second caps 72 and 74 are provided with entry means to allow outside air at atmospheric pressure to enter through the caps 72 and 74 into the passageways 18 and 20. The air entry means may be spiral grooves in the edges of the caps 72 and 74 which are in contact with the first pressure conduit 8 or the second pressure conduit 10. The third embodiment 70 also has a fourth pressure conduit 76 positioned on the same side of the sealing lever 24 as the first pressure conduit 8. The first pressure conduit 8 is approximately aligned with the second pressure conduit 10, approximately perpendicular to the extended longitudinal axis of the third pressure conduit 12, and approximately parallel to the fourth pressure conduit 76. The fourth pressure conduit 76 is positioned under the first pressure conduit 8. The fourth pressure conduit 76 has a fourth passageway 78 extending through the fourth pressure conduit 76. Preferably, the first pressure conduit 8 and the third pressure conduit 12 may be shorter in length than the second pressure conduit 10 and the fourth pressure conduit 76 because the first pressure conduit 8 and the second pressure conduit 10 are closed by the caps 72 and 74.

As an example of the way in which the third embodiment 70 of the pressure control apparatus of this invention may be used, the second passageway 20 may be used as an inlet passageway and connected to a source of pressure, such as a vacuum or high pressure. The fourth passageway 76 may be used as an outlet passageway. Like the first embodiment 6, the third embodiment 70 has a first seal 40 disposed on the first passageway side of the sealing lever 24 at the seal end 38 of the sealing lever 24 and a second seal 42 disposed on a second passageway side of the sealing lever 24 at the seal end 38 of the sealing lever 24. The third embodiment 70 need not have a third seal 58 (which is used in the second embodiment 56 shown in FIG. 4). The first passageway 18 is used as a return passageway and is exposed to atmospheric pressure. Unlike the first embodiment 6 and the second embodiment 56, the third embodiment 70 is normally open because the second seal 42 normally does not cover the interior end of the second passageway 20 in the non-actuated position. When an electric signal is applied to the solenoid 44, the first seal 40 opens the first passageway 18 and the second seal 42 closes the second passageway 20. Thus, inlet pressure or vacuum from the second passageway 20 is removed from the outlet passageway, which is the fourth passageway 78, and atmospheric pressure from the first passageway 18 is applied to the outlet passageway, fourth passageway 78.

Figure 6:
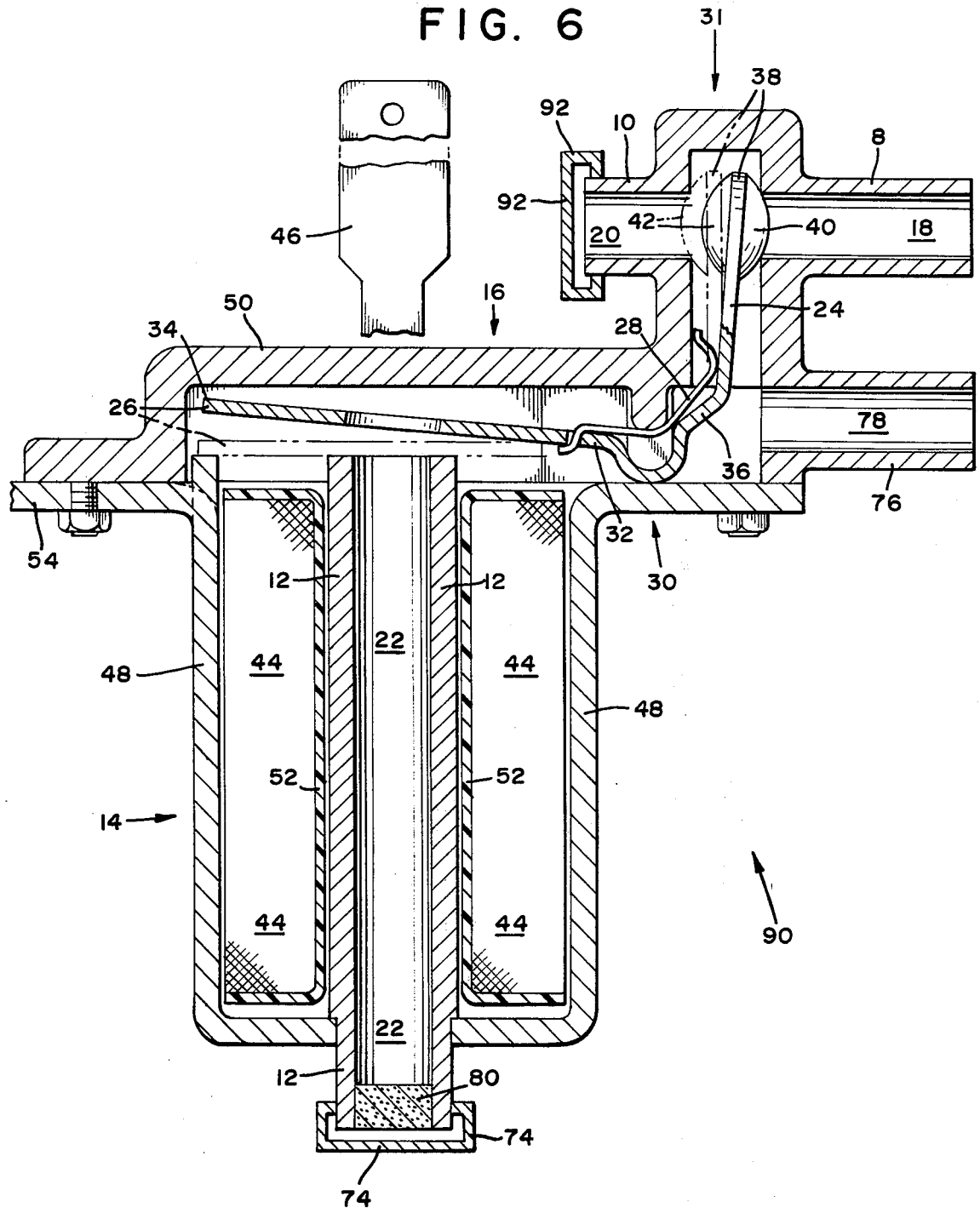
FIG. 6 is a cross-sectional view of a fourth embodiment of the pressure control apparatus.

Preferably, the third embodiment 70 includes an orifice means disposed in the third passageway 22. Preferably, the orifice means is a plug 80 which may be inserted in the third passageway 22. Optionally, for uses in response to gaseous vacuum, the plug 80 may have a small orifice 82 through the center of the plug 80, as shown in FIG. 5 or the plug 80 may be porous to air, as shown in FIG. 6. The plug 80 is adapted to provide a bleed port or ports, either by means of the orifice 82 or by means of the pores. As a result, the plug 80 is a bleeder means which allows entry of outside air at all times under atmospheric pressure, to purge the system being controlled.

Referring to FIG. 6, a fourth embodiment of the pressure control apparatus of this invention is indicated generally by the numeral 90, and is adapted for gaseous media only. The fourth embodiment is similar to the third embodiment 70, except that the fourth embodiment 90 has a second cap 74 on the exterior end of third pressure conduit 12 and a third cap 92 on the exterior end of the second pressure conduit 10, rather than on the first pressure conduit 8. The third cap 92 has air entry means similar to the first cap 72 and second cap 74 of the third embodiment 70. Thus, the fourth embodiment 90 has a first pressure conduit 8, a second pressure conduit 10, a third pressure conduit 12, and a fourth pressure conduit 76. The first pressure conduit 8 has a first passageway 18 extending through the first pressure conduit 8. The second pressure conduit 10 has a second passageway 20 extending through the second pressure conduit 10. The third pressure conduit 12 has a third passageway 22 extending through the third pressure conduit 12. The fourth pressure conduit 76 has a fourth passageway 78 extending through the fourth pressure conduit 76. The first pressure conduit 8 is approximately aligned with the second pressure conduit 10, approximately perpendicular to the extended longitudinal axis of the third pressure conduit 12 and approximately parallel to the fourth pressure conduit 76. The fourth pressure conduit 76 is disposed under the first pressure conduit 8. Both caps 74 and 92 provide a splash proof closure adapted to prevent entry of water, dirt and foreign matter into the passageways 20 and 22, but allow entry of air into the passageways 20 and 22. The means for allowing entry of air may be spiral grooves on the edges of each cap 74 and 92 which make contact with the conduits 10 and 12. Preferably, the second pressure conduit 10 and the portion of the third pressure conduit 12 which extends outside the housing 4 may be shorter in length than the first pressure conduit 8 and the fourth pressure conduit 76 because the second pressure conduit 10 and the third pressure conduit 12 are closed by caps 92 and 74.

As an example of the way in whichs the fourth embodiment 90 may be used, the first passageway 18 may be connected, as an inlet passageway, to a source of pressure or vacuum. The fourth passageway 78 may be an outlet passageway.

When an electric signal is applied to the solenoid 44, the first passageway 18 is opened by first seal 40 and the second passageway 20 is closed by second seal 42. As a result, either a vacuum or high pressure at the first passageway 18 is communicated to the outlet passageway, which is the fourth passageway 78, because the first passageway 18 has been opened.

The second passageway 20 is a return passageway. When the electric signal is applied to the solenoid 44, the second passageway 20 is closed by second seal 42, closing off outside air under atmospheric pressure through passageway 20 and allowing the vacuum or high pressure in first passageway 18 to communicate with the fourth passageway 78. Outside air under atmospheric pressure continues to be available through third passageway 22. When the electric signal is removed from the solenoid 44, the first passageway 18 is closed by the first seal 40. As a result, the fourth passageway 78, which is the outlet, is connected to the return passageway 20. Preferably, the fourth embodiment includes a plug means disposed in the third passageway 22. Preferably, the plug means is a plug 80, which may be inserted in the third passageway 22. Optionally, for uses in response to a vacuum, the plug 80 may have a small orifice 82 through the center of the plug 80, as shown in FIG. 5, or the plug 80 may be porous to air, as shown in FIG. 6. The plug 80 is a bleeder means for allowing outside atmospheric air to enter into passageway 22, for purging the system being controlled.

All of the four embodiments of the pressure control apparatus of this invention provides significant advantages in lower cost of manufacture and simplicity of operation as a result of: (1) the use of mechanical advantage in the armature assembly, (2) which allows smaller physical size of the coil, (3) which allows reduction in the amount of copper used in the coil.

I claim:

1. An electrically-operated, pressure control apparatus adapted to perform switching and actuating functions, said apparatus comprising:
    a first pressure conduit having a first passageway extending between a point exterior of said apparatus and a point in the interior of said apparatus;
    a second pressure conduit having a second passageway extending between a point exterior of said apparatus and a point in the interior of said apparatus;
    a third pressure conduit having a third passageway extending between a point exterior of said apparatus and a point in the interior of said apparatus;
    a coil assembly adapted to be energized electrically and exert a magnetic force, said coil assembly disposed within said appparatus;
    an armature assembly having an actuated position and a non-actuated position and adapted to be operated electromagnetically when said coil assembly is energized, said armature assembly comprising: a sealing lever having sealing means thereon disposed immediately adjacent to at least two of said passageways for directly contacting a portion of said at least two passageways to open and close said at least two passageways; an armature lever acted upon directly by said coil assembly and adapted to pivot between an actuated position and a non-actuated position as a result of the magnetic force from said coil assembly; a biasing means biasing said armature lever in said non-actuated position; and a pivot means upon which said armature assembly pivots from said actuated position to said non-actuated position; and wherein:
    said armature lever has a pivot end and a coil end; said sealing lever has a pivot end and a seal end, said pivot end of said sealing lever being attached to said pivot end of said armature lever; an effective, operating length of said armature lever is greater than an effective, operating length of said sealing lever, said armature assembly having a mechanical advantage resulting from the ratio of the length of said armature lever to the length of said sealing lever; said armature assembly is adapted to apply said mechanical advantage with reference to the force exerted by said coil assembly upon said armature and with reference to a force applied by a portion of said sealing lever adjacent to said sealing end of said sealing lever, whereby the force of said coil assembly upon said armature lever is multiplied by said mechanical advantage for purposes of the force applied to the portion of said sealing lever adjacent to said seal end of said sealing lever; and wherein
    said third pressure conduit extends through the approximate center of said coil assembly.

2. The electrically-operated, pressure control apparatus of claim 1 and further comprising a housing disposed around said coil assembly and said third pressure conduit; and a cover over said armature assembly.

3. The electrically-operated, pressure control apparatus of claim 1 wherein said coil assembly comprises:
    a solenoid having a length of conducting wire wound in a coil, said solenoid having a hollow interior adapted to receive said third pressure conduit; and
    a means for receiving an electrical signal and conducting it to said solenoid to energize said solenoid.

4. The electrically-operated, pressure control apparatus of claim 3 wherein said coil assembly further comprises a bobbin on which said conducting wire is wound to form said solenoid.

5. An electrically-operated, pressure control apparatus adapted to perform switching and actuating functions, said apparatus comprising:
    a first pressure conduit having a first passageway extending between a point exterior of said apparatus and a point in the interior of said apparatus;
    a second pressure conduit having a second passageway extending between a point exterior of said apparatus and a point in the interior of said apparatus;
    a third pressure conduit having a third passageway extending between a point exterior of said apparatus and a point in the interior of said apparatus;
    a coil assembly adapted to be energized electrically and exert a magnetic force, said coil assembly disposed within said apparatus; and an armature assembly having an actuated position and a non-actuated position and adapted to be operated electromagnetically when said coil assembly is energized, said armature assembly disposed adjacent to said coil assembly and acted upon directly by said coil assembly, said armature assembly having a sealing means disposed immediately adjacent to at least two of said passageways for directly contacting a portion of said at least two passageways to open said and close said at least two passageways.

6. The electrically-operated, pressure control apparatus of claim 5 wherein:
    said sealing means comprises a first seal adjacent said first passageway and adapted to open and close said first passageway;
    said armature assembly comprises an armature lever; and
    said armature lever comprises a third seal adjacent said third passageway and adapted to open and close said third passageway.

7. The electrically-operated, pressure control apparatus of claim 5 wherein said armature assembly further comprises:
    an armature lever acted upon directly by said coil assembly and adapted to pivot between an actuated position and a non-actuated position as a result of the magnetic force from said coil assembly;
    a return spring biasing said armature lever in said non-actuated position; and
    a pivot means upon which said armature assembly pivots from said actuated position to said non-actuated position.

8. The electrically-operated, pressure control apparatus of claim 7 wherein:
    said armature lever has a pivot end and a coil end;
    said sealing lever has a pivot end and a seal end, said pivot end of said sealing lever being attached to said pivot end of said armature lever;
    an effective, operating length of said armature lever is greater than an effective, operating length of said sealing lever, said armature assembly having a mechanical advantage resulting from the ratio of the length of the said armature lever to the length of said sealing lever; and said armature assembly is adapted to apply said mechanical advantage with reference to the force exerted by said coil assembly upon said armature lever and with reference to force applied by a portion of said sealing lever adjacent to said sealing end of said sealing lever, whereby the force of said coil assembly upon said armature lever is multiplied by said mechanical advantage for purposes of the force applied at the portion of said sealing lever adjacent to said seal end of said sealing lever.

9. The electrically-operated, pressure control apparatus of claim 7 wherein:

said first passageway has an interior and an exterior end;

said second passageway has an interior and an exterior end;

said interior end of said first passageway is disposed adjacent to said interior end of said second passageway; and said sealing means of said sealing lever is disposed between said interior end of said first passageway and said interior end of said second passageway and is adapted to move between a sealing position at said interior end of said first passageway and a sealing position at said interior end of said second passageway.

10. The electrically-operated, pressure control apparatus of claim 8 wherein said seal end of said sealing lever has a first passageway side adjacent said first passageway and a second passageway side adjacent said second passageway and wherein said sealing means comprises:

a first seal disposed on the first passageway side of said sealing lever at the seal end of said sealing lever; and a second seal disposed on the second passageway side of said sealing lever at the seal end of said sealing lever, said second seal being on an opposing side of said seal end from said first seal.

11. The electrically-operated, pressure control apparatus of claim 5 wherein said third pressure conduit extends through the approximate center of said coil assembly and said third passageway communicates alternately with said first passageway and said second passageway depending upon the position of said armature assembly.

12. The electrically-operated, pressure control apparatus of claim 5 and further comprising a housing disposed around said coil assembly and said third pressure conduit.

13. The electrically-operated, pressure control apparatus of claim 5 and further comprising a cover over said armature assembly.

14. An electrically-operated, pressure control apparatus adapted to perform switching and actuating functions, said apparatus comprising:

a first pressure conduit having an exterior end, an interior end, and a first passageway extending between a point exterior of said apparatus and a point in the interior of said apparatus;

a second pressure conduit having an exterior end, an interior end, and a second passageway extending between a point exterior of said apparatus and a point in the interior of said apparatus;

a third pressure conduit having an exterior end, an interior end and, a third passageway extending between a point exterior of said apparatus and a point in the interior of said apparatus;

a fourth pressure conduit having an exterior end an interior end and a fourth passageway extending between a point exterior of said apparatus and a apoint in the interior of said apparatus;

a coil assembly adapted to be energized electrically and exert a magnetic force, said coil assembly disposed within said apparatus; and an armature assembly having an actuated position and a non-actuated position and adapted to be operated electromagnetically when said coil assembly is energized, said armature assembly disposed adjacent to said coil assembly and acted upon directly by said coil assembly, said armature assembly having a sealing means disposed immediately adjacent to at least two of said passageways for directly contacting a portion of said at least two passageways to open said and close said at least two passageways; and wherein said third pressure conduit extends through the approximate center of said coil assembly.

15. The electrically-operated, pressure control apparatus of claim 14 and further comprising a first cap over the exterior end of said first pressure conduit and a second cap over the exterior end of said third pressure conduit.

16. The electrically-operated, pressure control apparatus of claim 14 and further comprising a third cap over the exterior end of said second pressure conduit and a second cap over the exterior end of said third pressure conduit.

17. An electrically-operated, pressure control apparatus adapted to perform switching and actuating functions, said apparatus comprising:

a first pressure conduit having a first passageway;

a second pressure conduit having a second passageway;

a third pressure conduit having a third passageway;

a coil assembly adapted to be energized electrically and exert a magnetic force, said coil assembly being disposed within said apparatus;

an armature assembly having an actuated position and a non-actuated position and adapted to be operated electromagnetically when said coil assembly is energized, said armature assembly comprising: a sealing lever having sealing means adapted to open and close said first passageway and said second passageway; an armature lever adapted to be acted upon directly by said coil assembly and adapted to pivot between an actuated position and a non-actuated position as a result of the magnetic force from said coil assembly; a return spring biasing said armature lever in said non-actuated position; and a pivot means upon which said armature assembly pivots from said actuated position to said non-actuated position; and wherein:

said armature lever has a pivot end and a coil end; said sealing lever has a pivot end and a seal end, said pivot end of said sealing lever being attached to said pivot end of said armature lever; an effective, operating length of said armature lever is greater than an effective, operating length of said sealing lever, said armature assembly having a mechanical advantage resulting from the ratio of the length of said armature lever to the length of said sealing lever; said armature assembly is adapted to apply said mechanical advantage with reference to the force exerted by said coil assembly upon said armature and with reference to a force applied by a portion of said sealing lever adjacent to said sealing end of said sealing lever, whereby the force of said coil assembly upon said armature lever is multiplied by said mechanical advantage for purposes of the force applied at the portion of said sealing lever adjacent to said seal end of said sealing lever; and wherein said first passageway has an interior end and an exterior end; said second passageway has an interior end and an exterior end; said interior end of said first passageway is disposed adjacent to said interior end of said second passageway; and said sealing means of said sealing lever is disposed between said interior end of said first passageway and said interior end of said second passageway and is adapted to move between said interior end of said first passageway and said interior end of said second passageway; and wherein said third pressure conduit extends through the approximate center of said coil assembly; and wherein said seal end of said sealing lever has a first passageway side adjacent said first passageway and a second passageway side adjacent said second passageway and wherein said sealing means comprises: a first seal disposed on the first passageway side of said sealing lever at the seal end of said sealing lever; and a second seal disposed on the second passageway side of said sealing lever at the seal end of said sealing lever, said second seal being on an opposing side of said seal end from said first seal.

18. An electrically-operated, pressure control apparatus adapted to perform switching and actuating functions, said apparatus comprising:

a first pressure conduit having a first passageway extending between a point exterior of said apparatus and a point in the interior of said apparatus;

a second pressure conduit having a second passageway extending between a point exterior of said apparatus and a point in the interior of said apparatus;

a third pressure conduit having a third passageway extending between a point exterior of said apparatus and a point in the interior of said apparatus;

a coil assembly adapted to be energized electrically and exert a magnetic force, said coil assembly being disposed within said apparatus;

an armature assembly having an actuated position and a non-actuated position and adapted to be operated electromagnetically when said coil assembly is energized, said armature assembly comprising: a sealing lever having sealing means adapted to open and close said first passageway; an armature lever adapted to be acted upon directly by said coil assembly and adapted to pivot between an actuated position and a non-actuated position as a result of the magnetic force from said coil assembly; a return spring biasing said armature lever in said non-actuated position; and a pivot means upon which said armature assembly pivots from said actuated position to said non-actuated position; and wherein said armature lever has a pivot end and a coil end; said sealing lever has a pivot end and a seal end, said pivot end of said sealing lever being attached to said pivot end of said armature lever; an effective, operating length of said armature lever being greater than an effective, operating length of said sealing lever, said armature assembly having a mechanical advantage resulting from the ratio of the length of said armature lever to the length of said sealing lever; said armature assembly is adapted to apply said mechanical advantage with reference to the force exerted by said coil assembly upon said armature lever and with reference to a force applied by a portion of said sealing lever adjacent to said sealing end of said sealing lever, whereby the force of said coil assemby upon said armature lever is multiplied by said mechanical advantage for purposes of the force applied at the portion of said sealing lever adjacent to said seal end of said sealing lever; and wherein said first passageway has an interior end and an exterior end; said first passageway is disposed approximately parallel to said second passageway; said sealing means of said sealing lever is disposed adjacent to said interior end of said first passageway; and wherein said third pressure conduit extends through the approximate center of said coil assembly; and wherein said seal end of said sealing lever has a first passageway side adjacent said interior end of said first passageway said sealing means comprises: a first seal dipsosed on the first passageway side of said sealing lever at the seal end of said sealing lever and adapted to open and close said interior end of said first passageway; and said armature lever comprises a third seal adjacent said third passageway and adapted to open and close said third passageway.

19. An electrically-operated, pressure control apparatus adapted to perform switching and actuating functions, said apparatus comprising:

a first pressure conduit having a first passageway and an exterior end and an interior end, said passage extending between a point exterior of said apparatus and a point in the interior of said apparatus;

a second pressure conduit having a second passageway and an exterior end and an interior end, said passage extending between a point exterior of said apparatus and a point in the interior of said apparatus;

a third pressure conduit having a third passageway and an exterior end and an interior end, said passage extending between a point exterior of said apparatus and a point in the interior of said apparatus;

a fourth pressure conduit having a fourth passageway and an exterior end and an interior end, said passage extending between a point exterior of said apparatus and a point in the interior of said apparatus;

a coil assembly adapted to be energized electrically and exert a magnetic force, said coil assembly being disposed within said apparatus;

a first cap over the exterior end of said first pressure conduit;

a second cap over the exterior end of said third pressure conduit;

an armature assembly having an actuated position and a non-actuated position and adapted to be operated electromagnetically when said coil assembly is energized, said armature assembly disposed adjacent to said coil assembly and acted upon directly by said coil assembly, said armature assembly comprising: a sealing lever having sealing means adapted to open and close said first passageway; an armature lever adapted to be acted upon directly by said coil assembly and adapted to pivot between an actuated position and a non-actuated position as a result of the magnetic force from said coil assembly; a return spring biasing said armature lever in said non-actuated position; and a pivot means upon which said armature assembly pivots from said actuated position to said non-actuated position;

said armature lever has a pivot end and a coil end; said sealing lever has a pivot end and a seal end, said pivot end of said sealing lever being attached to said pivot end of said armature lever; an effective, operating length of said armature lever being greater than an effective, operating length of said sealing lever, said armature assembly having a mechanical advantage resulting from the ratio of the length of said armature lever to the length of said sealing lever; said armature assembly being adapted to apply said mechanical advantage with reference to the force exerted by said coil assembly upon said armature lever and with reference to a force applied by a portion of said sealing lever adjacent to said sealing end of said sealing lever, whereby the force of said coil assembly upon said armature lever is multiplied by said mechanical advantage for purposes of the force applied at the portion of said sealing lever adjacent to said seal end of said sealing lever; and wherein said first passageway has an interior end and an exterior end; said second passageway has an interior end and an exterior end; said interior end of said first passageway is disposed adjacent to said interior end of said second passageway; and said sealing means of said sealing lever is disposed between said interior end of said first passageway and said interior end of said second passageway and is adapted to move between said interior end of said first passageway and said interior end of said second passageway; and wherein said seal end of said sealing lever has a first passageway side adjacent said first passageway and a second passageway side adjacent said second passageway and wherein said sealing means comprises: a first seal disposed on the first passageway side of said sealing lever at the seal end of said sealing lever, and a second seal disposed on the second passageway side of said seal; and wherein said third pressure conduit extends through the approximate center of said coil assembly; and wherein said first pressure conduit is approximately parallel to said fourth pressure conduit.

20. An electrically-operated, pressure control apparatus adapted to perform switching and actuating functions, said apparatus comprising:

a first pressure conduit having a first passageway and an exterior end and an interior end, said passageway extending between a point exterior of said apparatus and a point in the interior of said apparatus;

a second pressure conduit having a second passageway and an exterior end and an interior end, said passageway extending between a point exterior of said apparatus and a point in the interior of said apparatus;

a third pressure conduit having a third passageway and an exterior end and an interior end, said passageway extending between a point exterior of said apparatus and a point in the interior of said apparatus;

a fourth pressure conduit having a fourth passageway and an exterior end and an interior end, said passageway extending between a point exterior of said apparatus and a point in the interior of said apparatus;

a coil assembly adapted to be energized electrically and exert a magnetic force, said coil assembly being disposed within said apparatus;

a third cap over the exterior end of said second pressure conduit;

a second cap over the exterior end of said third pressure conduit;

an armature assembly having an actuated position and a non-actuated position and adapted to be operated electromagnetically when said coil assembly is energized, said armature assembly disposed adjacent to said coil assembly and acted upon directly by said coil assembly, said armature assembly comprising: a sealing lever having sealing means adapted to open and close said first passageway and said second passageway; an armature lever adapted to be acted upon directly by said coil assembly and adapted to pivot between an actuated position and a non-actuated position as a result of the magnetic force from said coil assembly; a return spring biasing said armature lever in said non-actuated position; and a pivot means upon which said armature assembly pivots from said actuated position to said non-actuated position; and wherein said armature lever has a pivot end and a coil end; said sealing lever has a pivot end and a seal end, said pivot end of said sealing lever being attached to said pivot end of said armature lever; an effective, operating length of said armature lever being greater than an effective, operating length of said sealing lever, said armature assembly having a mechanical advantage resulting form the ratio of the length of said armature lever to the length of said sealing lever; said armature assembly is adapted to apply said mechanical advantage with reference to the force exerted by said coil assembly on said armature lever and with reference to a force applied by a portion of said sealing lever adjacent to said sealing end of said sealing lever, whereby the force of said coil assembly upon said armature lever is multiplied by said mechanical advantage for purposes of the force applied at the portion of said sealing lever adjacent to said seal end of said sealing lever; and wherein said first passageway has an interior and an exterior end; said second passageway has an interior and an exterior end; said interior end of said first passageway is disposed adjacent to said interior end of said second passageway; and said sealing means of said sealing lever is disposed between said interior end of said first passageway and said interior end of said second passageway and is adapted to move between said interior end of said first passageway and said interior end of said second passageway;

said seal end of said sealing lever has a first passageway side adjacent said first passageway and a second passageway side adjacent said second passageway and wherein said sealing means comprises: a first seal disposed on the first passageway side of said sealing lever at the seal end of said sealing lever; and a second seal disposed on the second passageway side of said seal; and wherein said third pressure conduit extends through the approximate center of said coil assembly; and wherein said first pressure conduit is approximately parallel to said fourth pressure conduit.

21. An electrically-operated, pressure control apparatus adapted to perform switching and actuating functions, said apparatus comprising:

a first pressure conduit having a first passageway;

a second pressure conduit having a second passageway;

a third pressure conduit having a third passageway;

a coil assembly adapted to be energized electrically and exert a magnetic force, said coil assembly being disposed within said apparatus; and an armature assembly having an actuated position and a non-actuated position and adapted to be operated electromagnetically when said coil assembly is energized; said armature assembly further comprising: a sealing lever having sealing means to open and close said first passageway, an armature lever acted upon directly by said coil assembly to pivot between an actuated position and a non-actuated position as a result of the magnetic force from said coil assembly, a return spring biasing said armature lever in said non-actuated position, and a pivot means upon which said armature assembly pivots from said actuated position to said non-actuated position; and wherein;

said first passageway has an interior end and an exterior end; said second passageway has an interior end and an exterior end; said interior end of said first passageway is disposed adjacent to said interior end of said second passageway; and said sealing means of said sealing lever is disposed between said interior end of said first passageway and said interior end of said second passageway for movement between a sealing position at said interior end of said first passageway and a sealing position at said interior end of said second passageway.

22. An electrically-operated, pressure control apparatus adapted to perform switching and actuating functions, said apparatus comprising:

a first pressure conduit having a first passageway;

a second pressure conduit having a second passageway;

a third pressure conduit having a third passageway;

a coil assembly adapted to be energized electrically and exert a magnetic force, said coil assembly being disposed within said apparatus; and an armature assembly having an actuated position and a non-actuated position and adapted to be operated electromagnetically when said coil assembly is energized; said armature assembly further comprising: a sealing lever having sealing means to open and close said first passageway, an armature lever acted upon directly by said coil assembly to pivot between an actuated position and a non-actuated position as a result of the magnetic force from said coil assembly, a return spring biasing said armature lever in said non-actuated position, and a pivot means upon which said armature assembly pivots from said actuated position to said non-actuated position; and wherein:

said armature lever has a pivot end and a coil end; said sealing lever has a pivot end and a seal end, said pivot end of said sealing lever being attached to said pivot end of said armature lever; an effective, operating length of said armature lever is greater than an effective, operating length of said sealing lever, said armature assembly having a mechanical advantage resulting from the ratio of the length of the said armature lever to the length of said sealing lever; and said armature assembly applies said mechanical advantage with reference to the force exerted by said coil assembly upon said armature lever and with reference to force applied by a portion of said sealing lever adjacent to said sealing end of said sealing lever, whereby the force of said coil assembly upon said armature lever is multiplied by said mechanical advantage for purposes of the force applied at the portion of said sealing lever adjacent to said seal end of said sealing lever;

said seal end of said sealing lever has a first passageway side adjacent said first passageway and a second passageway side adjacent said second passageway and said sealing mean comprises: a first seal disposed on the first passageway side of said sealing lever at the seal end of said sealing lever; and a second seal disposed on the second passageway side of said sealing level at the seal end of said sealing lever, said second seal being on an opposing side of said seal end from said first seal.

* * * * *